Nov. 6, 1962
G. F. RUSSELL
3,061,992
GAS TREATMENT BY ADSORPTION
Filed Dec. 12, 1958
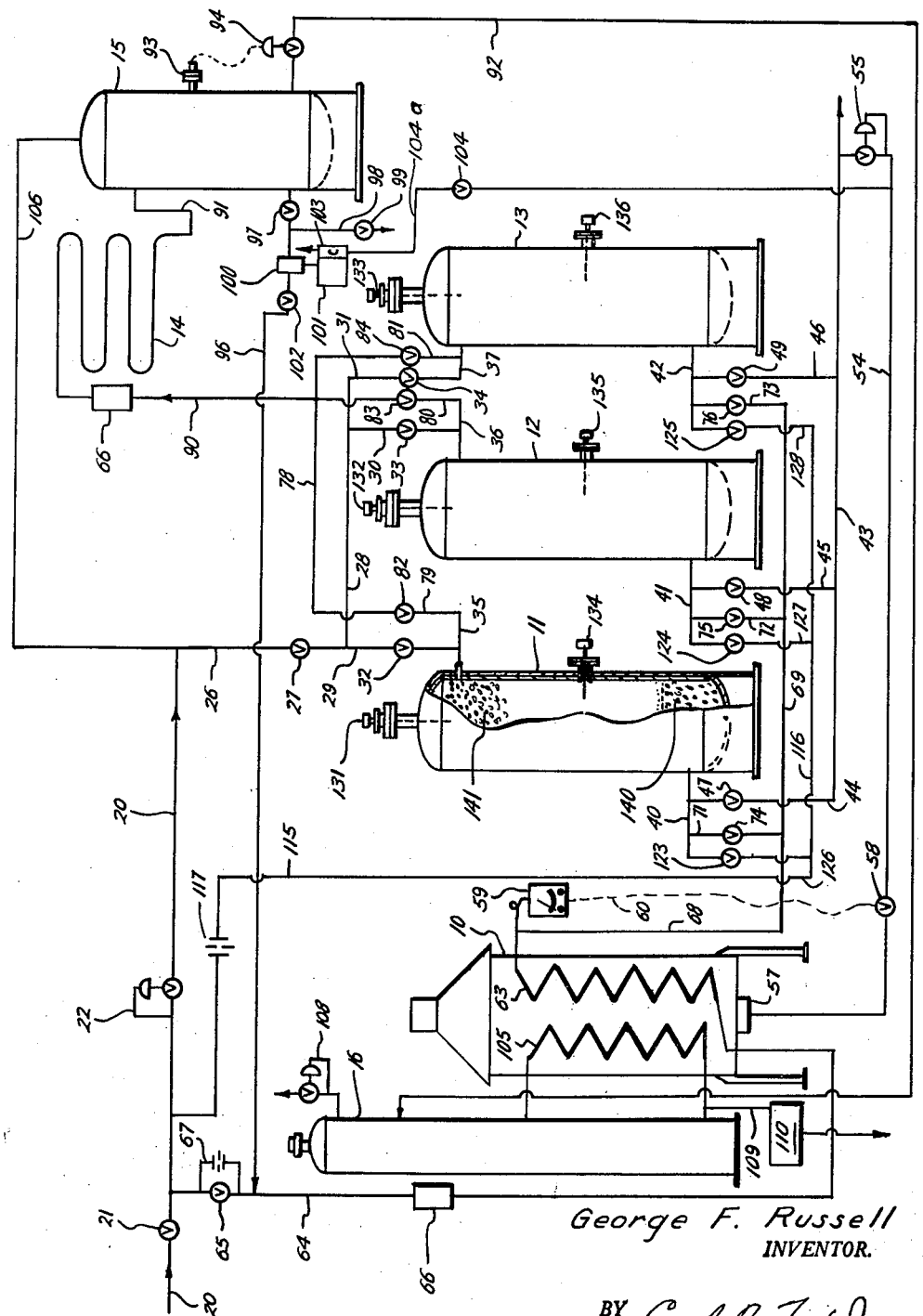
George F. Russell
INVENTOR.
BY Carl B. Fox, Jr.
ATTORNEY

United States Patent Office 3,061,992
Patented Nov. 6, 1962

3,061,992
GAS TREATMENT BY ADSORPTION
George F. Russell, % Russell Engineering Corp., 2609 Sunset Blvd., Houston, Tex.
Filed Dec. 12, 1958, Ser. No. 779,965
10 Claims. (Cl. 55—31)

This invention pertains to the processing of petroleum, and more particularly to the processing of gaseous hydrocarbons and to the recovery of condensables therefrom. The apparatus and methods herein disclosed are also suitable for processing of non-petroleum materials, as will be apparent from the disclosure.

A principal object of the invention is to provide apparatus and methods for the processing of petroleum gases.

Another object of the invention is to provide apparatus and methods enabling alteration of the composition of a petroleum gas and recovery of liquifiable components therefrom.

Another object of the invention is to provide apparatus and methods for processing petroleum gases so as to improve their properties, performance as fuels, and salability. Another object of the invention is to provide such apparatus and methods which utilize substances removed from the entering flow stream to accomplish the treating functions necessary for operation, so that no other substances need be fed to the system except those of the one entering flow stream.

Another object of the invention is to provide such apparatus and methods which are economical in operation, and yet which produce increased product output.

Briefly the invention includes apparatus and methods for efficiently denuding gas streams. The gas is passed through adsorbent beds. The adsorbent beds must be frequently reactivated by regeneration, and, consequently, a cyclic operation is carried out wherein the beds are used to substantial saturation and regenerated for the succeeding cycle, and so on. A plural adsorbent bed tower system provides continuity of operation. An important feature of the invention is the use of water and condensate removed from the gas stream as the regeneration vehicle, and as a result, no agent for regeneration other than the feed stream materials is required for operation of the system. The water used as the regeneration vehicle is distilled water, of high purity and having low corrosion tendencies, in view of the fact that the water when used to make steam for bed regeneration, has been volatilized from the bed by distillation, and then condensed.

In processes of similar nature, it is well known to reactivate or regenerate adsorbent beds by use of steam introduced to the system from some exterior source such as a boiler. It is also well known to use petroleum gases for regeneration. This invention represents a step forward over the known processes in that it provides steam and/or gas regeneration cycles by recirculation of components already present in the system, and in addition employs the regeneration heat source in a novel manner for operation of a stabilizer means which increases the plant output in a manner which will be further explained.

Other objects and advantages of the invention will appear from the following description of preferred embodiments, reference being made to the accompanying drawing which shows the preferred embodiment of the apparatus and process in schematic form.

Referring now to the drawing in detail, there is shown a gas-fired heater 10, a bank of three adsorption towers 11, 12, 13, a condenser 14, a knockout drum 15 and a stabilizer tower 16. These principal apparatus elements are interconnected by suitable piping and controls for their operation.

The entering, or feed, gas is introduced to the system through a pipe 20, flow therethrough being controlled by a valve 21, the flow direction being indicated by an arrow. Pipe 20 is also equipped with a pressure regulator 22 to control the entering gas pressure at about 5 p.s.i.g., higher than the downstream gas pressure. This pressure difference is used to propel the regeneration gas stream through the apparatus, as will be further described. Pipe 20 continues, as pipe 26 having valve 27, to a manifold pipe 28, from which branch pipes 29, 30, 31 each lead into the upper part of one of the adsorption towers 11, 12, 13, respectively. Flow through branch pipes 29, 30, 31 is controlled by the valves 32, 33, 34, respectively. Pipes 29, 30, 31 are manifold into the respective towers through inlet-outlet manifold pipes 35, 36, 37 as shown in the drawing.

Towers 11, 12, 13 are provided with inlet-outlet manifold pipes 40, 41, 42 at their respective lower ends. A product gas outlet manifold 43 is connected to each of pipes 40, 41, 42, and to the towers, by the pipes 44, 45, 46 the flow through each of which is controlled by the respective valve 47, 48, 49.

A fuel gas line 54, flow therethrough controlled by pressure regulator valve 55 branches from manifold pipe 43 and extends to the gas burner 57 of heater 10. Pressure regulator valve 55 controls gas pressure in pipe 54 at about 100 p.s.i.g., the gas pressure in manifold 43 normally being about 1000 p.s.i.g. An automatic control valve 58, in line 54 between regulator valve 55 and burner 57, is operatively interconnected with a temperature control device 59, as indicated by dash line 60, so that the fuel gas feed rate to burner 57 is responsive to the operation of heater 10, to be described.

Heater 10 has therewithin a pipe coil 63. A pipe 64, flow through which is controlled by an automatic control valve 65, branches from pipe 20 between valve 21 and pressure regulator 22, and extends to the lower end of coil 63 to be interconnected therewith. Pipe 64 passes, intermediate its length, through a heat exchanger 66 wherein residual heat from the gases leaving the adsorbers 11, 12, 13 is recovered by out-of-contact heat transfer in exchanger 66 with the hot adsorber exit gases. An orifice by-pass 67 by-passes around valve 65 so that a constant minimum flow continuously passes through pipe 64. The upper end of coil 63 is interconnected with a heater outlet pipe 68. Pipe 68 leads to a manifold pipe 69 from which branch pipes 71, 72, 73 each extend to a tower manifold 40, 41, 42, respectively, of towers 11, 12, 13. Branch pipes 71, 72, 73 are equipped with valves 74, 75, 76, respectively, for control of flow therethrough.

At the upper ends of towers 11, 12, 13 there is a pipe manifold 78, and branch pipes 79, 80, 81, flow through which is controlled by valves 82, 83, 84, respectively, lead from upper tower manifold 35, 36, 37 to manifold 78. A pipe 90 extends from manifold 78 to the condenser 14, which may be cooled in any manner as by air, water, refrigeration, etc. Pipe 90, prior to its discharge into the condenser, passes through heat exchanger 66, previously mentioned, wherein partial cooling of the gases in pipe 90 is effected by out-of-contact heat exchange with the gases passing to heater 10 through pipe 64. The condenser outlet is connected by a pipe 91 into the upper end of knockout drum 15.

A condensed liquid outlet pipe 92, flow through which is controlled by liquid level control 93 provided through a side of the knockout drum to control an automatic valve 94 in pipe 92, extends from a lower part of drum 15 into the upper end of the stabilizer tower 16. A second liquid outlet from knockout drum 15 is provided by a pipe 96 which extends from the drum to be interconnected into pipe 64 between valve 65 and heater 10. Pipe 96 is provided with a valve 97, a branch pipe drain outlet 98 controlled by valve 99, a liquid circulating pump 100 driven by a gas driven motor 101, and a pump outlet valve 102. Valves 97, 102 are block valves used only when it is desired to shut off about pump 100 for repairs or the like. Pump 100 controls the flow through pipe 96 during operation. Gas driven motor 101, which drives pump 100, is controlled, on and off, by a control 103 which operates in response to opening and closing of an automatic valve 104 in pipe 104a. Pipe 104a extends from pipe 54, the low pressure burner gas pipe, to the control 103.

Heat for operation of stabilizer tower 16 is supplied to the tower by means of a second heater coil 105 provided within heater 10. Thus, as will be additionally described, efficiency of operation is achieved by use of the single heater means 10 for dual purposes, this permitting greater stability and continuity of operation, and resulting in lower plant equipment costs.

The gases separated overhead in knockout drum 15 pass through an upper outlet pipe 106 leading from the top of the drum to be interconnected with pipe 20 at its juncture with pipe 26 leading to manifold 28.

Stabilizer tower 16 has an upper pressure controlled outlet 108 through which the overhead gas is vented to atmosphere or carried away to be used elsewhere. Residual condensed liquid bottoms, primarily liquifiable hydrocarbons (which may be controlled by regulation of pressure valve 108 to include ethane and all heavier constituents and carbon dioxide found in the inlet gas stream), are discharged through outlet pipe 109 leading through a cooler 110 from the tower base.

A pipe 115 extends from a connection with pipe 20 between valve 21 and pressure regulators 22 to a manifold pipe 116. Pipe 115 is provided with an orifice 117, which is a fixed-plate type orifice, the plate being changed to change orifice flow characteristics. Branch pipes 120, 121, 122, lead, respectively, from manifold 116 to tower manifolds 40, 41, 42. Valves 123, 124, 125, respectively in branch pipes 120, 121, 122, control the flow therethrough.

Adsorption towers 11, 12, 13 are each equipped with two controls responsive to internal tower temperatures to control valves of the system. These controls are designated by reference numerals 131—136 in the drawing. Controls 131—133 are at the tops of the respective towers for response to temperatures at the upper zone of the tower packing. Controls 134—136 are disposed at vertically intermediate points of the respective towers for response to temperatures at vertically intermediate zones of the tower packing.

Each of the three adsorption towers 11, 12, 13 operates cyclically through three repetitive operating phases. At any given time, one of the towers is processing the gas stream entering from pipes 20, 26, another of the towers is being regenerated by heated flow from heater 10, and the other of the towers is being cooled after regeneration by cool gas entering from pipe 115. The controls for the system are arranged so that the six tower controls 131—136 sequentially and cyclically control the operation.

In order to fully explain the control sequence, assume, that tower 11 is just beginning a gas processing phase, that tower 12 is just beginning a regeneration phase, and that tower 13 is just beginning a cooling phase. Thus, tower 11 has just completed a cooling phase, tower 12 has just completed a gas processing phase, and tower 13 has just completed a regeneration phase.

At tower 11, check valve 32 is open to admit gas from pipes 20, 26, 28 to enter the top of the tower through branch pipe 29 and manifold 35; valve 47 is open to permit treated gas to leave the bottom of the tower through manifold 40, branch pipe 44 and product manifold 43. Valves 74, 82, 123 are closed. Entering gas to be treated by adsorption in one of the towers is directed into the upper end of tower 11, since valve 27, a block or cut off valve, is open, and the gas passes downwardly through the tower packing and out as product gas. The entering gas comprises principally methane ($CH_4$) and ethane ($C_2H_6$) and variable amounts of other $C_1$—$C_{10}$ hydrocarbons, nitrogen ($N_2$), carbon dioxide ($CO_2$), hydrogen sulfide ($H_2S$), water vapor ($H_2O$), and traces of helium, argon, other rare gases, and hydrogen, all of which may or may not be present depending on the source of the gas. The treated gas leaving tower 11 through pipe 43 comprises principally methane and ethane (natural gas), a pre-selected portion of the materials mentioned above having been removed by adsorption in tower 11.

The internal packing of tower 11 consists of a lower relatively shallow bed 140 of some adsorbent material such as activated alumina, activated silica gel, molecular sieve adsorbents, such as crystalline alumina silicates, zeolites, and the like, or other adsorbent material of a type designed to have a high adsorptive capacity for one or more of the substances, such as water, desired to be extracted from the gas stream. The upper, usually relatively deeper, packing bed 141, extending from the upper surface of bed 140 to near the upper end of the tower, consists of some adsorbent material having a high adsorptive capacity for hydrocarbon materials other than methane and ethane, that is, having a high adsorptive capacity for hydrocarbons, such as activated charcoal, silica-gel, or the like. The adsorptive bodies of both beds are granular so that passages through the beds permit free gas flow through the tower. All three towers 11, 12, 13 will generally be provided with the packing as described for tower 11.

Considering the tower packing as a whole, beds 140, 141 together, the packing when it has adsorbed materials from the gas stream passing downwardly therethrough to saturation of its adsorptive ability, will contain adsorbed materials in the amount of about 28% of the weight of the fresh packing. That is, 100 pounds of fresh packing will adsorb about 28 pounds of adsorbable material to saturation and then will adsorb no more. However, by use of the procedure described herein, the packing may be regenerated to be again useful as an adsorption vehicle, repeatedly.

Still referring to the stated assumed conditions of towers 11, 12, 13, at tower 12, just beginning a packing regeneration phase, valve 75 is open to admit gas, from pipes 20, 64, 68, 69, 72 and heated in coil 63 of heater 10, into the base of tower 12 through manifold 41. Valves 48 and 124 are closed. At the top of the tower, valve 83 is open to permit gases which have passed upwardly through the tower to be led off through pipes 36, 80, 78, 90 and cooler 66 to condenser 14, and thence through pipe 91 to knockout drum 15. Valve 33 is closed. The described condition continues until such time as the packing bed in tower 12 at temperature controller 135 is increased in temperature to a predetermined temperature, at which time valve 104 is opened to operate controller 103 to start motor 101 in operation and thereby to start pump 100 in operation. Pump 100, thereafter to the end of the regeneration phase pumps liquid, principally distilled water, from knockout drum 15 through pipes 96, 64, 63, 68, 69, 72 and 41 into the base of tower 12, the liquid having been converted to superheated steam or vapor upon passing through heater 10. At this period, valve 65 has been shut off, so that a predetermined amount of gas, depending on the total operating pressure, from pipe 20 and through orifice bypass 67 enters the system, thus lowering the partial pressure of water and other vapor introduced to tower 12 by pump 100, and thereby preventing undesired condensation of same in tower 12 during this regeneration cycle.

Therefore, the packing bed regeneration phase of each tower 11, 12, 13 consists of two sub-phases, during the first of which hot raw natural gas is passed upwardly through the packing to pre-heat the packing upwardly from the bottom to the level of controller 134, 135, or 136, after which during the second regeneration subphase, the packing is further heated to its maximum temperature of about 400–500° F. by the previously mentioned superheated steam and gas generated in heater 10. The sub-phase regeneration, therefore, is superior to known types of regeneration with steam alone or with heated gas alone, since the tower packing is regenerated by a medium having a low partial pressure of the material which is being driven from the bed. Therefore, the described regeneration is to be distinguished from the known procedures and is superior thereto.

It has already been mentioned that the described packing materials become saturated with adsorbed materials as described when they contain about 28% of their own weight of the adsorbed materials. The known hot rich gas regeneration procedures succeed in reducing the adsorbed material contents of beds after regeneration by otherwise comparable conditions only down to about 11% to 12% of adsorbed materials based on the packing weight. The novel regeneration, with the two described sub-phases of heated gas and then superheated steam, succeeds in reducing the adsorbed material contents of the beds after regeneration down to about 5% of adsorbed materials based on the type of packing material. Regeneration according to this disclosure therefore provides that an additional bed capacity of 6% to 7% is available for each cycle of operation of each tower equal to about 35% more hydrocarbon retention. Adsorption and regeneration by known methods causes adsorption and removal of materials amounting to only about 16% to 17% of the packing weight per cycle, while adsorption and regeneration by this method causes adsorption and removal of materials amounting to about 23% of the packing weight per cycle. The resulting advantages in plant economics and capacity will be obvious.

These regeneration advantages are the result of application, a more economical source of bed heating medium to the bed, and which produces a lower partial pressure of constituents being removed from the bed, so that optimum conditions for regeneration are maintained.

The gases driven off of a tower by regeneration are cooled at condenser 14 and delivered into knockout drum 15, where condensed liquids separate from the gas in the knockout drum or accumulator. Non-condensables such as methane, ethane, air, $N_2$, and the like, pass upwardly and through pipe 106 to be reintroduced with the gases in pipe 26 for feeding to the towers. A lighter gravity liquid phase, principally hydrocarbons but also containing small amounts of other materials, are drawn off through pipe 92, valve 94 thereof being controlled by liquid level control 93 so that a constant level of liquids is held in drum 15. This flow from the drum goes to stabilizer tower 16, previously described. A heavier gravity liquid phase, principally water, is pumped out through pipe 96 as has been described. Since more water is recovered in towers 11—13 than is required for the steam sub-phases of regeneration, the excess water is removed from the drum with the lighter gravity liquid hydrocarbon phase and may pass through stabilizer tower 16 with the hydrocarbon materials, if not withdrawn separately by the duo-phase level control on drum 15, through line 98.

Again referring to the stated assumed conditions of towers 11, 12, 13, at tower 13, just beginning a packing cooling phase, valve 125 is open to admit untreated cooling gas from pipe 20, and at the higher pressure side of regulator valve 22, into the base of tower 13 through pipe 115, orifice 117, and pipes 116, 128, 42. Valves 34, 49, 76 are closed. At the upper end of tower 13, valve 84 is open to allow the cooling gas after its upward flow through the tower to be exited through pipes 37, 81, 78, 90, condenser 14, and pipe 91 to knockout drum 15. Thus the cooling gases, and the materials which they flush from the tower, are mingled with the regeneration gases from tower 12, and receive the same treatment. The cooling gases, which are at substantially atmospheric temperature when introduced into the base of a tower, cool most of the packing in the tower to atmospheric temperature or substanatially to atmospheric temperature. The orifice 117 controls the rate of cooling gas flow so that the packing cooling time is made to be substantially equal to the gas processing phase time and the regeneration phase time so that the three phases will be of substantially equal duration so that the cyclic operation of each tower through the three phases can be carried out smoothly on a continuous basis.

Thus each tower 11, 12, 13 will be operated through each of its three phases, but each tower is at any given moment in a different phase from each of the other two towers.

The control system which operates the valves controlling flow to and from towers 11, 12, 13 has not been described in detail. However, there are several control systems known to those skilled in the art which may be adapted for use, and any of these may be used. The control system is required to open and/or close plural valves at serially and cyclically related times, and the signal to the control system of the occurrence of any such time is given by temperature controls 131—136 disposed in the towers to respond to internal tower temperatures. Thus, beginning at the stated assumed conditions referred to before, the controls 131—136 will control valves of the system in the sequence: 135, 132, 134, 131, 136, 133, 135, 132, 134, 131, 136, 133 (two complete cycles) and so forth, ad infinitum, or until operations are ceased. It will be apparent that each tower will then go through gas processing, regeneration, cooling, gas processing, regeneration, cooling phases, repetitively until operations are ceased.

The phase and cycle times will relate to the type of gas treated, type of tower packing used, equipment sizes, products desired, and the like, according to good engineering economics.

Using the apparatus and method described, natural gas can be efficiently and economically treated to produce acceptable and salable gas and liquid hydrocarbon products. These products may, of course, be subjected to additional refining processing if desired.

While preferred embodiments of the apparatus and methods have been shown and described, many modifications thereof may be made by a person skilled in the art without departing from the spirit of the invention, and it is intended to protect by Letters Patent all forms of the invention falling within the scope of the following claims:

I claim:

1. Method for treating wet gases by adsorption, comprising, in continuous cyclic sequence, passing a stream of said wet gases to be treated through a porous bed of adsorptive materials so that water from said wet gases is adsorbed from said wet gases by the bed to dehydrate said wet gases, heating a stream of said wet gases to reduce the relative vapor pressure of water thereof and passing same through the bed to heat the bed and to remove adsorbed water in the form of distilled water from the bed and condensing and separating the removed water, preparing steam by vaporizing said separated distilled water and passing the steam through the bed to further heat the bed, and again passing a stream of said wet gases to be treated through the bed to first cool the bed and to commence another cycle, said separated distilled water being in sufficient quantity so that other water need not be introduced to provide sufficient steam to adequately heat the bed.

2. Method for treating raw natural gas by adsorption, said raw natural gas including methane, ethane, water vapor, and condensable hydrocarbons, comprising, in continuous cyclic sequence, passing a stream of said raw natural gas to be treated through a porous bed of adsorptive materials so that substantially all of said water vapor and condensable hydrocarbons are adsorbed from said raw natural gas by the bed to dehydrate and purify said raw natural gas, heating a stream of said raw natural gas and passing same through the bed to heat the bed and to remove adsorbed water and condensable hydrocarbons from the bed and condensing and separating said removed water, as distilled water, and condensable hydrocarbons, preparing substantially pure live steam by vaporizing said separated distilled water and passing the steam through the bed to heat the bed to cause regeneration of the bed, and again passing a stream of raw natural gas to be treated through the bed to first cool the bed and to commence another cycle, said separated distilled water being in sufficient quantity so that other water need not be introduced to provide sufficient steam to adequately heat and regenerate the bed.

3. Method according to claim 2, wherein said bed of adsorptive material contains a first portion highly adsorptive to water vapor and a second portion highly adsorptive to said other hydrocarbons.

4. Method according to claim 3, wherein said heated gas stream contacting said bed contacts said first bed portion before it contacts said second bed portion, whereby adsorbed water is first driven from said bed by distillation to be condensed as distilled water, and wherein said steam thereafter drives said condensable hydrocarbons from said second bed portion, whereby the adsorbed water and condensable hydrocarbons are each driven from the bed by a medium having a low partial pressure of the material being driven from the bed.

5. In an adsorption system of a cyclic type wherein water is adsorbed on a bed and then removed by regeneration in the form of distilled water and wherein hydrocarbons are adsorbed on the bed and then removed by regeneration, the improved method comprising using the distilled water removed from the bed to remove the hydrocarbons from the bed by converting the distilled water removed from the bed to substantially pure live steam and contacting the bed therewith.

6. Adsorption apparatus comprising a plurality of adsorption towers each having gas treating, regeneration, and cooling operational phases, said gas treating phases of said towers being at different times and following one after the other in repeating cyclic sequence so that at any given time one of said towers, and only one, is in said gas treating phase so that gas treating is substantially continuous, means for directing a gas stream through each of said towers, one after another in repeating sequence, in the manner described, means for directing a regenerative gas stream consisting substantially of live steam made from water recovered in prior regeneration phases as distilled water through each of said towers after each of said gas treating phases thereof has been completed and during a said regeneration phase thereof, means for recovering water from said regeneration gases after they pass from a tower, and means for directing a purging and cooling gas stream through each of said towers after each of said regeneration phases thereof and during a said cooling phase thereof to purge the tower and simultaneously to commence another said gas treating phase.

7. The combination of claim 6, each said tower containing internal packing capable of adsorbing water and other materials, said regenerative gas stream removing said water and other materials therefrom substantially separately during each said regeneration phase.

8. The combination of claim 7, said regenerative gas stream directing means directing an initial hydrocarbon stream and a final steam rich stream through said packing of a said tower during each said regeneration phase thereof.

9. The combination of claim 6, each said tower containing internal packing which becomes heated by direct contact with live steam during each said regeneration phase thereof, said purging and cooling gas stream cooling said packing to substantially atmospheric temperature during each said cooling phase thereof, the next treating phase beginning where the cooling has been effected in the tower.

10. The combination of claim 9, said packing including first packing material including one or more materials of the group consisting of activated charcoal and activated silica gel, and second packing material including one or more materials of the group consisting of activated alumina, activated silica gel and molecular sieve materials.

References Cited in the file of this patent

UNITED STATES PATENTS

| | | |
|---|---|---|
| 1,912,784 | Miller et al. | June 6, 1933 |
| 2,535,902 | Dailey | Dec. 26, 1950 |
| 2,629,460 | Maki | Feb. 24, 1953 |
| 2,910,139 | Matyear | Oct. 27, 1959 |
| 2,919,764 | Dillman et al. | Jan. 5, 1960 |

FOREIGN PATENTS

| | | |
|---|---|---|
| 283,508 | Great Britain | June 11, 1929 |
| 504,227 | Great Britain | Apr. 21, 1939 |
| 572,677 | Great Britain | Oct. 18, 1945 |